US011180613B2

United States Patent
Lässig et al.

(10) Patent No.: US 11,180,613 B2
(45) Date of Patent: Nov. 23, 2021

(54) SYNERGISTIC COMBINATIONS OF PLATINUM COMPOUNDS AND RHODIUM COMPOUNDS AS CATALYSTS IN HYDROSILYLATIONS

(71) Applicant: Heraeus Deutschland GmbH & Co. KG, Hanau (DE)

(72) Inventors: Walter Lässig, Gelnhausen (DE); Weiwen Dong, Hanau (DE); Richard Walter, Alzenau (DE); Detlef Gaiser, Hanau (DE); Jörg Fuchs Alameda, Biebergemünd (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 0 days.

(21) Appl. No.: 16/626,485

(22) PCT Filed: Dec. 19, 2017

(86) PCT No.: PCT/EP2017/083477
§ 371 (c)(1),
(2) Date: Dec. 24, 2019

(87) PCT Pub. No.: WO2019/001754
PCT Pub. Date: Jan. 3, 2019

(65) Prior Publication Data
US 2020/0115504 A1    Apr. 16, 2020

(30) Foreign Application Priority Data

Jun. 27, 2017 (EP) .................................... 17178145

(51) Int. Cl.
| | | |
|---|---|---|
| *C08G 77/08* | (2006.01) | |
| *C08G 77/12* | (2006.01) | |
| *C08G 77/20* | (2006.01) | |

(52) U.S. Cl.
CPC ............ *C08G 77/08* (2013.01); *C08G 77/12* (2013.01); *C08G 77/20* (2013.01)

(58) Field of Classification Search
CPC ...... B01J 23/42; B01J 23/464; B01J 31/0255; C08G 77/08; C08G 77/12; C08G 77/20
See application file for complete search history.

(56) References Cited

U.S. PATENT DOCUMENTS

| 3,775,452 A | 11/1973 | Karstedt | |
|---|---|---|---|
| 3,814,730 A * | 6/1974 | Karstedt et al. ........ | C08L 83/00 528/15 |
| 2002/0099159 A1 | 7/2002 | Reitz et al. | |
| 2002/0142174 A1* | 10/2002 | Kropp ..................... | C08K 5/14 428/447 |
| 2003/0073859 A1 | 4/2003 | Reitz et al. | |

FOREIGN PATENT DOCUMENTS

| JP | 2004519544 A | | 7/2004 |
|---|---|---|---|
| JP | 2009114240 | * | 5/2009 |
| JP | 2009114240 A | | 5/2009 |
| JP | 2014076924 A | | 5/2014 |

OTHER PUBLICATIONS

JP 2009 114240 machine translation (2009).*
Database WPI Week 201247 Thomson Scientific, London, GB; AN2012-F04538 XP002775440, & CN 102 417 981 A (Chinese Acad Sci Process Eng Inst) Apr. 18, 2012 (Apr. 18, 2012) abstract.
International Search Report issued in PCT/EP2017/083477 dated Mar. 5, 2018.
Planes, et al., Rhodium and Platinum Hydrosilylation Catalysts for Increasing UV Stability of Poly(dimethylsiloxane) in Geostationary Environment, Polymer: Degradation and Stability, 2017, 142:111-116.
Solomonsz, et al., Controlling the Regioselectivity of the Hydrosilylation Reaction in Carbon Nanoreactors, Chem. Eur. J., 2012, 18:13180-13187.

* cited by examiner

*Primary Examiner* — Kuo Liang Peng
(74) *Attorney, Agent, or Firm* — Blank Rome LLP

(57) ABSTRACT

Composition for use as catalyst in hydrosilylations, comprising at least one platinum compound selected from the group consisting of $Pt[(Me_2SiCH{=}CH_2)_2O]_2$ and $Pt_2[(Me_2SiCH{=}CH_2)_2O]_3$ and at least one rhodium compound selected from the group consisting of $Rh(acac)(CO)_2$, $Rh_2(CO)_4Cl_2$, $[Rh(cod)Cl]_2$, $Rh(acac)(cod)$, $RhH(CO)(PPh_3)_3$, $Rh(CO)(PPh_3)(acac)$, $RhCl(CO)(PPh_3)_2$, and Rh-2-ethylhexanoate at a molar ratio of Pt/Rh in the range of 0.1 to 100.

20 Claims, No Drawings

SYNERGISTIC COMBINATIONS OF PLATINUM COMPOUNDS AND RHODIUM COMPOUNDS AS CATALYSTS IN HYDROSILYLATIONS

This application is a national stage of International Patent Application No. PCT/EP2017/083477, filed Dec. 19, 2017, which claims the benefit of European Application No. 17178145.3, filed Jun. 27, 2017, each of which are hereby incorporated herein by reference in their entirety.

The invention relates to synergistic combinations of certain platinum compounds and rhodium compounds as catalysts in hydrosilylations.

A hydrosilylation is an addition of an HSi group to an olefinic double bond, usually catalysed homogeneously. The reaction can be used to build-up higher molecular weight organo-silicon compounds and/or silicones. Examples of silicone products comprise elastomer moulded parts, impression materials, sealants, embedding materials, grouting compounds, impregnating agents, coating agents, and many more.

The homogeneous catalysis of hydrosilylation reactions with the so-called Karstedt catalyst is known from U.S. Pat. No. 3,775,452A. The Karstedt catalyst can be described by the following formulas: $Pt[(Me_2SiCH=CH_2)_2O]_2$ and $Pt_2[(Me_2SiCH=CH_2)_2O]_3$.

It is the object of the invention to provide hydrosilylation catalysts with higher catalytic activity than that of the Karstedt catalyst.

The applicant discovered that a combination of at least one platinum compound selected from the group consisting of $Pt[(Me_2SiCH=CH_2)_2O]_2$ and $Pt_2[(Me_2SiCH=CH_2)_2O]_3$ and at least one rhodium compound selected from the group consisting of $Rh(acac)(CO)_2$, $Rh_2(CO)_4Cl_2$, $[Rh(cod)Cl]_2$, $Rh(acac)(cod)$, $RhH(CO)(PPh_3)_3$, $Rh(CO)(PPh_3)(acac)$, $RhCl(CO)(PPh_3)_2$, and Rh-2-ethylhexanoate at a molar ratio of Pt/Rh in the range of 0.1 to 100, preferably 0.3 to 5, and in particular 0.8 to 3, surprisingly meets the object of the invention. Accordingly, said combinations of these basically known precious metal compounds at comparable or even lower mass fraction of precious metal in a composition that is capable of hydrosilylation have proven—in the sense of an unexpected synergism—to be catalytically more effective in hydrosilylations than the Karstedt catalyst alone or the corresponding rhodium compounds alone. As a result, it becomes feasible to catalyse hydrosilylations at a lower total mass fraction of precious metal and/or to lower the reaction temperature during hydrosilylations.

The term, "composition that is capable of hydrosilylation", is used herein to refer to those compositions that comprise one or more compounds with at least one HSi group that is suitable with respect to a hydrosilylation and one or more compounds with at least one olefinic double bond that is suitable with respect to a hydrosilylation and/or one or more compounds with at least one HSi group that is suitable with respect to a hydrosilylation and at least one olefinic double bond that is suitable with respect to a hydrosilylation. It shall be mentioned explicitly that the term, "composition that is capable of hydrosilylation", is used herein independent of whether or not a respective composition comprises a hydrosilylation catalyst as well. A hydrosilylation can be performed with a composition that is capable of hydrosilylation. In a hydrosilylation, an HSi group is added to an olefinic double bond. Referring to the present invention, this takes place in a precious metal-catalysed manner by means of the synergistic combination of the at least one platinum compound and the at least one rhodium compound.

Said synergistically higher catalytic activity of a combination according to the invention can be determined by means of DSC (differential scanning calorimetry) according to DIN EN ISO 11357-5:2014, for example at a heating rate of 10 K/min, in the form of an exothermic peak indicating a hydrosilylation reaction taking place in a composition that is capable of hydrosilylation. As determined by the applicant, the exothermic peak is usually situated at a lower temperature than the peak of a composition capable of hydrosilylation to which has been added a Karstedt catalyst alone or one or more of the above-mentioned rhodium compounds alone, but that is otherwise identical to the composition that is capable of hydrosilylation, notably at the same mass fraction of precious metal in the composition that is capable of hydrosilylation.

The above-mentioned synergistically higher catalytic activity of a combination according to the invention can be determined, alternatively or additionally, by comparing the pot life values of said compositions that are capable of hydrosilylation. For the purposes of the present patent application, the pot life shall be defined as the period of time it takes the initial viscosity to increase two-fold. The viscosity, i.e. the initial viscosity as well as the viscosity increasing over time, can be determined, for example, by means of rotational viscosimetry.

In general, the invention relates to a composition comprising at least one platinum compound selected from the group consisting of $Pt[(Me_2SiCH=CH_2)_2O]_2$ and $Pt_2[(Me_2SiCH=CH_2)_2O]_3$ and at least one rhodium compound selected from the group consisting of $Rh(acac)(CO)_2$, $Rh_2(CO)_4Cl_2$, $[Rh(cod)Cl]_2$, $Rh(acac)(cod)$, $RhH(CO)(PPh_3)_3$, $Rh(CO)(PPh_3)(acac)$, $RhCl(CO)(PPh_3)_2$, and Rh-2-ethylhexanoate at a molar ratio of Pt/Rh in the range of 0.1 to 100, preferably 0.3 to 5, and in particular 0.8 to 3.

The platinum compounds known as Karstedt catalyst $Pt[(Me_2SiCH=CH_2)_2O]_2$ or $Pt_2[(Me_2SiCH=CH_2)_2O]_3$ can be produced, for example, by autocatalysis-supported conversion of $H_2PtCl_6$ with a reducing agent, such as isopropanol, in the presence of a base such as $NaHCO_3$ and 1,1,3,3-tetramethyl-1,3-divinyldisiloxane, cf. EP 1 174 435 A2 and EP 1 302 473 A2. Said platinum compounds are commercially available, inter alia from Heraeus, in the form of organic solvents comprising said platinum compounds at various platinum fractions in the range of 15 to 28 wt % (weight-%) by the name of "Karstedt Concentrate".

$Rh(acac)(CO)_2$, $Rh_2(CO)_4Cl_2$, $[Rh(cod)Cl]_2$, $Rh(acac)(cod)$, $RhH(CO)(PPh_3)_3$, $Rh(CO)(PPh_3)(acac)$, $RhCl(CO)(PPh_3)_2$, and Rh-2-ethylhexanoate are commercially available rhodium compounds.

$Rh(acac)(CO)_2$, Acetylacetonatodicarbonylrhodium(I), is available, for example from Heraeus and from Umicore, by the name of CARAC in either case.

$Rh_2(CO)_4Cl_2$, Rhodium(I)carbonylchloride, is available, for example, from Strem Chemicals Inc.

$[Rh(cod)Cl]_2$, Di-µ-chloro-bis(cycloocta-1,5-diene)dirhodium(I), is available, for example, from Heraeus. It is also available from Umicore by the name of Chiralyst P493.

Rh(acac)(cod), (Acetylacetonato)(1,5-cyclooctadiene)rhodium(I), is available, for example, from Heraeus. It is also available from Umicore by the name of Chiralyst P310.

$RhH(CO)(PPh_3)_3$, Carbonyl(hydrido)(tris(triphenylphosphane)rhodium(I), is available, for example, from Heraeus by the name of RODRIDO and from Umicore by the name of Rh HYDRIDO.

Rh(CO)(PPh$_3$)(acac) is available, for example, from Heraeus and from Umicore, by the name of ROPAC in either case.

RhCl(CO)(PPh$_3$)$_2$ is available, for example, from Strem Chemicals Inc.

Rh-2-ethylhexanoate is available, for example, from Heraeus and Umicore, in the form of a solution in either case.

Preferably, the at least one rhodium compound is selected from the group consisting of Rh(acac)(CO)$_2$, Rh$_2$(CO)$_4$Cl$_2$, and [Rh(cod)Cl]$_2$.

The composition according to the invention can be an organic solution, in particular a nonaqueous organic solution. The composition according to the invention, in the form of an organic solution, comprises at least one organic solvent, the at least one platinum compound and the at least one rhodium compound, each homogeneously dissolved. However, the composition according to the invention can just as well be a suspension with a continuous phase that contains the at least one platinum compound and the at least one rhodium compound, each homogeneously organically dissolved.

The at least one organic solvent can comprise a solvent that is reactive and/or non-reactive with respect to a hydrosilylation. Solvents that are reactive with respect to a hydrosilylation are those that can participate as reaction partners in a hydrosilylation, i.e. meaning compounds that provide at least one suitable HSi group and/or at least one suitable olefinic double bond. Preferably, the at least one organic solvent is selected from 1,1,3,3-tetramethyl-1,3-divinyldisiloxane, which is reactive with respect to a hydrosilylation, and solvents that are non-reactive with respect to a hydrosilylation from the group consisting of aromatic compounds, araliphatic compound such as, for example, toluene and xylene, halogenated hydrocarbons such as, for example, chlorobenzene and fluorobenzene, and oxygen-containing organic solvents such as, for example, methanol, ethanol, and isopropanol.

The composition according to the invention can comprise one or more inhibitors. The composition according to the invention can contain the inhibitor or inhibitors in the form of a single additive or single additives or aside from other additives. Examples of preferred inhibitors comprise anilines such as, for example, aniline, C≡C triple bond-containing alcohols such as, for example, ethinylcyclohexanol, and phenylpyridines such as, for example, phenylpyridine. The inhibitor or inhibitors can inhibit the hydrosilylation reaction and/or in the inventive synergistic catalysis of the hydrosilylation reaction. The inhibiting effect can be reduced and/or eliminated by increasing the temperature.

The composition according to the invention can comprise one or more further additives, for example aside from or instead of the at least one inhibitor. Examples comprise promoters, dyes, filling agents, dispersing agents, adhesion promoters, pigments, plasticisers, stabilisers, rheology controlling agents, and many more.

As mentioned above, the composition according to the invention can comprise at least one compound that is reactive with respect to a hydrosilylation. Said compounds provide at least one HSi group that is suitable with respect to a hydrosilylation and/or at least one olefinic double bond that is suitable with respect to a hydrosilylation. Said compounds that are reactive with respect to a hydrosilylation can be low molecular, oligomeric or polymeric. Examples of compounds providing suitable olefinic double bonds comprise the vinyl-functional polydimethylsiloxanes of the Polymer VS product series from Evonik. Examples of compounds providing suitable HSi groups comprise the polysiloxane cross-linkers of the Crosslinker 100 and Crosslinker 200 product series' from Evonik.

The at least one compound that is reactive with respect to a hydrosilylation can additionally serve as organic solvent that is reactive with respect to a hydrosilylation.

According to what has been mentioned above, the composition according to the invention can be a composition and/or reaction mixture that is capable of hydrosilylation, provided the composition comprises one or more compounds with at least one HSi group that is suitable with respect to a hydrosilylation and one or more compounds with at least one olefinic double bond that is suitable with respect to a hydrosilylation and/or one or more compounds with at least one HSi group that is suitable with respect to a hydrosilylation and at least one olefinic double bond that is suitable with respect to a hydrosilylation. For example, it can be a ready-made composition that is capable of hydrosilylation or, to be more precise, a composition of a desired formulation (of a desired formula) that is capable of hydrosilylation.

In embodiments, the composition according to the invention can essentially consist of the at least one platinum compound, the at least one rhodium compound, and, if desired, the components: one or more organic solvents, one or more inhibitors, one or more additives other than inhibitors, one or more compounds that are reactive with respect to a hydrosilylation. The term "essentially", as used herein, shall be understood to mean that no further additives are added, at least not deliberately; the potential presence of other ingredients in the sense of impurities that may originate, for example, from the production of the at least one platinum compound and/or of the at least one rhodium compound, shall be possible.

The composition according to the invention comprises a precious metal fraction (platinum plus rhodium) originating from the at least one platinum compound and the at least one rhodium compound, for example, in the range of 10 wt.-ppm (weight-ppm) to 45 wt %, preferably 30 wt.-ppm to 10 wt %, in particular 50 wt.-ppm to 5 wt %, relative to the total composition. Compositions according to the invention, in the form of compositions that are capable of hydrosilylation, have a precious metal fraction that is rather at the lower end of the specified range, for example in the range of 10 to 1,000 wt.-ppm, preferably 30 to 1,000 wt.-ppm or 30 to 500 wt.-ppm, in particular 50 to 500 wt.-ppm or 50 to 200 wt.-ppm, relative to the total composition that is capable of hydrosilylation.

The production of the composition according to the invention, in particular in the form of an organic solvent, requires no procedural particularities. For example, an organic solution comprising at least one organic solvent and the at least one platinum compound can be mixed with a further organic solution comprising at least one organic solvent and the at least one rhodium compound.

The invention also relates to a multicomponent system for production of the composition according to the invention. The multicomponent system can comprise, for example, a component (i) in the form of an organic solution comprising at least one organic solvent and the at least one platinum compound without the at least one rhodium compound, and a separate component (ii) in the form of an organic solution comprising at least one organic solvent and the at least one rhodium compound without the at least one platinum compound, and, if applicable, at least one separate component that differs from components (i) and (ii). The component that differs from components (i) and (ii) can comprise, for example, one or more inhibitors. A composition according to the invention can be produced by mixing components (i), (ii) and, if applicable, the at least one further component that differs from components (i) and (ii).

In another embodiment, the multicomponent system can comprise, for example, a component (i') in the form of an organic solution comprising at least one organic solvent, the at least one platinum compound, and the at least one rhodium compound, and at least one further separate component that differs from component (i'). The component that differs from component (i') can comprise, for example, one or more inhibitors. A composition according to the invention can be produced by mixing component (i') and the at least one further component that differs from component (i').

The invention also relates to the use of the composition according to the invention, for example in the form of an organic solution, as catalyst in a hydrosilylation (as hydrosilylation catalyst) or, as is evident from what has been mentioned above, as composition that is capable of hydrosilylation.

In an embodiment of the use as hydrosilylation catalyst, this concerns, in particular, the use of a first organic solution comprising at least one organic solvent and the at least one platinum compound without the at least one rhodium compound, in combination with a further organic solution comprising at least one organic solvent and the at least one rhodium compound without the at least one platinum compound. In other words, the composition according to the invention in this embodiment is realised only in a composition that is capable of hydrosilylation through separate addition of the two organic solutions to a composition that is capable of hydrosilylation and/or upon the production of a composition that is capable of hydrosilylation. For example, the two organic solutions are mixed with the yet catalyst-free composition that is capable of hydrosilylation and/or the components forming the latter.

In another embodiment of the use as catalyst in a hydrosilylation, this concerns, in particular, the use of an organic solution that already comprises the at least one platinum compound as well as the at least one rhodium compound. In other words, the composition according to the invention is realised already before the contact is established through addition to and/or mixing with a yet catalyst-free composition that is capable of hydrosilylation and/or the components forming the latter.

Depending on the type of its use and processing, said composition that is capable of hydrosilylation can comprise no or a desired fraction of additives, of non-reactive organic solvent, of reactive organic solvent, of compounds with at least one HSi group that is suitable with respect to a hydrosilylation and/or with at least one olefinic double bond that is suitable with respect to a hydrosilylation.

Hydrosilylations can be carried out with a composition according to the invention, for example in the form of a composition that is capable of hydrosilylation.

This can concern a hydrosilylation in the sense of a chemical synthesis of a low-molecular compound, more specifically, a silane compound.

Preferably, this concerns hydrosilylations that proceed in the sense of a cross-linking reaction, i.e. a polymerisation forming a polymer network—more specifically—a poly-addition.

A poly-addition of this type can be carried out in a range of low temperatures, for example from 0 to 38° C.; a composition that is capable of hydrosilylation and is used therein can expediently comprise no inhibitors.

But a poly-addition of this type can just as well take place at higher temperatures, for example in a temperature range of >38 to 150° C.

A duration of the processability (pot life) of a composition in use here that is capable of poly-addition by hydrosilylation can, for example, be 2 minutes to 10 hours.

Inhibitors can be used in this context.

Polymers produced as poly-addition products can, in terms of substances, for example be polysiloxanes and/or polymers with polysiloxane structures or silicones. In this context, a polysiloxane structure can originate from at least one compound with HSi groups capable of addition onto an olefinic double bond and/or at least one compound with olefinic double bonds capable of addition of an HSi group.

Said poly-addition can serve, for example, for formation of an impression, for example in the field of dentistry, a sealing, an embedding, a grouting, an impregnation, and in particular an elastomer moulded part or a coating on a substrate, or consist thereof.

Referring to the formation of an elastomer moulded part, a composition in use here that is capable of hydrosilylation can contain inhibitors or not. Expediently, no or only low fractions of non-reactive organic solvents may be contained therein, which might escape from the elastomer moulded part after termination of the poly-addition—possibly supported through suitable measures such as heating. Reactive organic solvent that can be incorporated into the elastomer to be formed through the polymerisation can be contained therein.

As mentioned above, the composition according to the invention, in the embodiment of a composition capable of hydrosilylation, may be formulated and/or used as a coating agent. Referring to the coating on a substrate, for example paper, cardboard, metal foil or plastic film, a composition in use here that is capable of hydrosilylation can expediently contain inhibitors, in particular, if a desired pot life is to be set. It may also be expedient to have non-reactive organic solvents be contained therein, which can escape from the coating during and/or after application of the coating agent and/or during and/or after poly-addition having taken place—possibly supported through suitable measures such as heating. Reactive organic solvent that can be incorporated into the polymer layer to be formed through the polymerisation can be contained therein.

EXAMPLES OF THE INVENTION AND REFERENCE EXAMPLES

Example 1: A total of 2.07 g of a mixture of Karstedt Concentrate from HERAEUS (platinum fraction 20 wt %) and Polymer VS 500 from EVONIK, the mixture having a platinum fraction of 0.52 wt %, were mixed with 0.548 g of a xylene-containing $Rh(acac)(CO)_2$ solution having a rhodium fraction of 0.52 wt % to produce a catalyst composition.

A total of 0.06 g 1-ethinylcyclohexanol, 79.9 g Polymer VS 500 from EVONIK, and 10.1 g Crosslinker 180 from EVONIK where mixed to produce a mixture that is capable of hydrosilylation.

A total of 1.38 g of the catalyst composition were mixed with 90 g of the mixture that is capable of hydrosilylation and had been preheated to 40° C.

The catalysed mixture thus produced that is capable of hydrosilylation was tested by means of DSC for the presence of an exothermic peak. The DSC test was an analysis of a hydrosilylation reaction by means of dynamic heat flux differential scanning calorimetry (measuring instrument:

DSC 200 F3 Maia, manufacturer: Netzsch Gerätebau GmbH) in closed aluminium crucibles according to DIN 11357-5:2014, 3.1, 9.2, 10.1 under argon (10 L/min) using a heating rate of 10 K/min in the range from 30° C. to 200° C. The temperature listed in Table 1 corresponds to the tip of the exothermic peak. The reproducibility of the measurement was 1-2° C.

Moreover, the pot life of the mixture was determined by rotational viscosimetry (Brookfield DV2Textra, Spindle LVT 4) at 40° C. The pot life corresponds to the time by which the initial viscosity has doubled. Typically, the mixture hardened thereafter within a few minutes.

Example 2: The procedure was analogous to Example 1 with the difference being that 1.06 g of the mixture comprising a platinum fraction of 0.52 wt % and 0.290 g of the xylene-containing Rh(acac)(CO)$_2$ solution were added separately to the mixture that is capable of hydrosilylation.

Examples 3 to 29: The procedure used in Examples 3 to 29 was analogous to Example 1.

The results of Examples 1 to 29 are shown in the table below. Examples 3, 4, 6 to 8, 21-24, and 29 are reference examples.

| Example | Rh compound | Molar ratio Pt/Rh | Pt + Rh content *) | Inhibitor **) | Exothermic peak at ° C. | Pot life |
|---|---|---|---|---|---|---|
| 1 | Rh(acac)(CO)$_2$ | 2 | 80 | 60 mg E | ./. | 1 h |
| 2 | Rh(acac)(CO)$_2$ | 2 | 80 | 60 mg E | ./. | 1 h |
| 3 | ./. | n.a. | 80 | 60 mg M | 83 | 57 min |
| 4 | ./. | n.a. | 80 | 60 mg E | ./. | 1 h 25 min |
| 5 | Rh(acac)(CO)$_2$ | 2 | 80 | 60 mg M | 69 | 36 min |
| 6 | ./. | n.a. | 30 | 120 mg E | 109 | 1 h 47 min |
| 7 | ./. | n.a. | 30 | 60 mg E | 99 | 11 h |
| 8 | ./. | n.a. | 30 | ./. | ./. | 20 min |
| 9 | [Rh(CO)$_2$Cl]$_2$ | 10.0 | 30 | 60 mg E | 98 | ./. |
| 10 | [Rh(CO)$_2$Cl]$_2$ | 1.3 | 30 | 60 mg E | 93 | 3 h 17 min |
| 11 | [Rh(COD)Cl]$_2$ | 2 | 30 | 60 mg E | 92 | ./. |
| 12 | Rh(acac)(CO)$_2$ | 2.6 | 30 | 120 mg E | 100 | 1 h 5 min |
| 13 | Rh(acac)(CO)$_2$ | 1.3 | 30 | 120 mg E | 106 | 52 min |
| 14 | Rh(acac)(CO)$_2$ | 0.3 | 30 | 60 mg E | 85 | 1 h 7 min |
| 15 | Rh(acac)(CO)$_2$ | 1.75 | 30 | 60 mg E | 85 | ./. |
| 16 | Rh(acac)(CO)$_2$ | 0 | 30 | 60 mg E | ./. | 1 h |
| 17 | Rh(acac)(CO)$_2$ | 2 | 30 | ./. | ./. | 18 min |
| 18 | Rh-2-ethylhexanoate | 5 | 30 | 60 mg E | 96 | ./. |
| 19 | Rh(acac)(CO)$_2$ | 2 | 100 | 60 mg E | 80 | 1 h |
| 20 | Rh(acac)(CO)$_2$ | 2 | 100 | 400 mg E | 104 | ./. |
| 21 | ./. | n.a. | 100 | 60 mg E | 81 | 1 h 25 min |
| 22 | ./. | n.a. | 100 | 400 mg E | 106 | ./. |
| 23 | ./. | n.a. | 150 | 120 mg E | 86 | ./. |
| 24 | ./. | n.a. | 150 | 200 mg A | ./. | 8 min |
| 25 | [Rh(COD)Cl]$_2$ | 2 | 150 | 200 mg A | ./. | 6 min |
| 26 | Rh(acac)(CO)$_2$ | 2 | 150 | 120 mg E | 84 | ./. |
| 27 | Rh(acac)(CO)$_2$ | 2 | 150 | 200 mg A | ./. | 5 min |
| 28 | [Rh(COD)Cl]$_2$ | 2.1 | 450 | 60 mg E | ./. | 5 min |
| 29 | ./. | n.a. | 450 | 60 mg E | ./. | 6 min | n.a., not applicable
A = Aniline
E = 1-Ethinylcyclohexanol
M = Maleic acid dimethylester
*) Content of the mixture that is capable of hydrosilylation, in wt.-ppm
**) per 90 g of mixture that is capable of hydrosilylation

The invention claimed is:

1. A composition comprising at least one platinum compound selected from the group consisting of Pt[(Me$_2$SiCH=CH$_2$)$_2$O]$_2$ and Pt$_2$[(Me$_2$SiCH=CH$_2$)$_2$O]$_3$, and at least one rhodium compound selected from the group consisting of Rh$_2$(CO)$_4$Cl$_2$, [Rh(cod)Cl]$_2$, Rh(acac)(cod), RhH(CO)(PPh$_3$)$_3$, Rh(CO)(PPh$_3$)(acac), and Rh-2-ethylhexanoate at a molar ratio of Pt/Rh in the range of 0.1 to 100.

2. The composition of claim 1, whereby the molar ratio of Pt/Rh is in the range of 0.3 to 5.

3. The composition of claim 1, wherein the composition has a pot life ranging from 2 minutes to 10 hours.

4. The composition of claim 1, whereby the at least one rhodium compound is selected from the group consisting of Rh$_2$(CO)$_4$Cl$_2$ and [Rh(cod)Cl]$_2$.

5. The composition of claim 1, wherein the composition is in the form of an organic solution comprising at least one organic solvent in addition to the at least one platinum compound and the at least one rhodium compound.

6. The composition of claim 5, wherein the at least one organic solvent is selected from the group consisting of solvents that are reactive in a hydrosilylation reaction and solvents that are non-reactive in a hydrosilylation reaction.

7. The composition of claim 5, wherein the at least one organic solvent is an araliphatic compound.

8. The composition of claim 1, further comprising at least one inhibitor.

9. The composition of claim 1, further comprising one or more additives other than inhibitors.

10. The composition of claim 1, further comprising at least one compound that is reactive in a hydrosilylation reaction, and is selected from the group consisting of low-molecular, oligomeric, and polymeric compounds.

11. The composition of claim 10, wherein the at least one compound that is reactive in a hydrosilylation reaction is selected from the group consisting of:
one or more compounds with at least one HSi group,
one or more compounds with at least one olefinic double bond, and
one or more compounds with at least one HSi group and at least one olefinic double bond.

12. The composition of claim 11, wherein the at least one compound that is reactive in a hydrosilylation reaction is one or more compounds with at least one HSi group and one or more compounds with at least one olefinic double bond, and/or one or more compounds with at least one HSi group and at least one olefinic double bond.

13. The composition of claim 12, wherein a precious metal fraction originating from the at least one platinum compound and the at least one rhodium compound is 10 to 1,000 wt.-ppm, relative to the total composition that is capable of hydrosilylation.

14. The composition of claim 1, wherein a precious metal fraction originating from the at least one platinum compound and the at least one rhodium compound of 10 wt.-ppm to 45 wt.-%, relative to the total composition.

15. A multicomponent system for production of a composition according to claim 1, the system comprising a component (i) in the form of an organic solution comprising at least one organic solvent and the at least one platinum compound without the at least one rhodium compound, and a separate component (ii) in the form of an organic solution comprising at least one organic solvent and the at least one rhodium compound without the at least one platinum compound.

16. The system of claim 15, further comprising at least one further separate component that differs from components (i) and (ii).

17. The system of claim 16, further comprising a component (i') in the form of an organic solution comprising at least one organic solvent, wherein
the at least one platinum compound, and the at least one rhodium compound, and at least one further separate component that differs from component (i').

18. A method for performing a hydrosilylation reaction, the method comprising reacting a composition according to claim 1 with one or more hydrosilylation reaction precursors.

19. The method of claim 18, wherein the hydrosilylation reaction is a chemical synthesis of a low-molecular silane compound or a polymer network-forming poly-addition.

20. The method of claim 19, wherein the poly-addition serves for formation of an impression, a sealing, an embedding, a grouting, an impregnation, an elastomer moulded part or a coating on a substrate, or consists of the production thereof.

\* \* \* \* \*